US007111707B2

(12) United States Patent
Reeves

(10) Patent No.: US 7,111,707 B2
(45) Date of Patent: Sep. 26, 2006

(54) SLIDING ANCHORAGE DEVICE

(76) Inventor: Eric W. Reeves, 8701 Mallard Creek Rd., Charlotte, NC (US) 28262

( * ) Notice: Subject to any disclaimer, the term of this patent is extended or adjusted under 35 U.S.C. 154(b) by 0 days.

(21) Appl. No.: 11/215,191

(22) Filed: Aug. 30, 2005

(65) Prior Publication Data

US 2006/0054388 A1 Mar. 16, 2006

Related U.S. Application Data

(63) Continuation of application No. 10/620,146, filed on Jul. 14, 2003, now Pat. No. 6,962,234.

(60) Provisional application No. 60/395,429, filed on Jul. 13, 2002.

(51) Int. Cl.
*F16B 1/00* (2006.01)
*E04G 7/08* (2006.01)

(52) U.S. Cl. .................. 182/36; 248/228.3; 248/228.5

(58) Field of Classification Search .................. 182/3, 182/36, 138, 113, 150; 52/DIG. 11; 248/228.5, 248/228.6, 229.24, 229.25, 228.1, 228.3, 248/292.12

See application file for complete search history.

(56) References Cited

U.S. PATENT DOCUMENTS 4,037,824 A 7/1977 Whitmer
4,052,028 A 10/1977 Cordero, Jr.
4,541,155 A 9/1985 Gagnon
4,767,091 A 8/1988 Cuny
4,928,790 A 5/1990 Franks
5,029,670 A 7/1991 Whitmer
5,092,426 A 3/1992 Rhodes
5,711,397 A 1/1998 Flora et al.
5,863,020 A 1/1999 Olson et al.
6,076,633 A 6/2000 Whitmer
6,092,623 A 7/2000 Collavino
6,691,827 B1 2/2004 Lycett

OTHER PUBLICATIONS

Guardian Fall Protection; BEAMER 2000; Published prior to Feb. 7, 2005.

*Primary Examiner*—Hugh B. Thompson, II
(74) *Attorney, Agent, or Firm*—Schwartz Law Firm P.C.

(57) ABSTRACT

An anchorage safety device for steelworkers. The safety device is configured to be slidably coupleable to a flanged structural beam to which a lanyard may be attached to secure a workman against a fall. The anchorage device includes an elongate cross-member having a plurality of apertures formed there-through to allow adjustment of the anchorage device to accommodate various beams, a lanyard attachment apparatus, affixed to the mid-point of the cross-member, for receiving a clip of a workman's lanyard; and opposed first and second clamps for coupling the device to the flange of a beam. The clamps include a ratchet pawl having first and second teeth for selectively engaging the cross-member apertures. The worker needs only one hand to release the ratchet pawl from the apertures by simultaneously applying pressure on an enlarged engagement surface of the ratchet pawl and a clamp housing surface that is opposed to the enlarged engagement surface. Since both forces must be simultaneously applied in opposite directions, inadvertent disengagement of the clamp from the cross-member is obviated.

14 Claims, 7 Drawing Sheets

8
8
200
202
204
206
208
210
212
214
215
220
222
224
240
242
246
250
252
260
270
272
274
296
298
F1
F2
F3

SLIDING ANCHORAGE DEVICE

CROSS REFERENCE TO RELATED APPLICATION

This application is a continuation of U.S. Application Ser. No. 10/620,146, now U.S. Pat. No. 6,962,234, which claims the benefit of U.S. Provisional Application No. 60/395,429, filed Jul. 13, 2002, and is hereby incorporated by reference.

BACKGROUND OF THE INVENTION

1) Field of the Invention

The present invention relates to a method and apparatus for securing a person during construction, and more particularly to a safety device slidably secured about a flanged structural beam to which a lanyard is attached to secure a workman against a fall.

2) Background of the Invention

Construction of steel frame structures, such as industrial plants and office buildings, often involve the necessity for steel workers to work a considerable distance above the ground in order to fasten individual beams and other components together. In high rise construction, these activities may take place in an environment subject to wind and weather, as well as subject to the typical construction site hazards of miscommunication, equipment failure or worker mishap. The Occupational Safety and Health Administration ("OSHA") of the United States, and similar agencies in various States, have promulgated regulations that require various safety devices to be used by workers who are occupationally exposed to the potential of a fall from an elevated structure.

Despite that there are numerous devices being offered in the market place, a demand exists for a simple, inexpensive device that may be used to preserve life and limb of the steel worker by providing secure fall protection. The need for such a device is especially seen in conjunction with work where significant freedom of movement is needed to enable accomplishment of a particular task. Furthermore, improvement in productivity can result from additional freedom of movement. As will be evident to those familiar with steel work at great heights and to whom this specification is particularly addressed, a device that may provide additional freedom of movement and ensure fail-safe fall protection would be of great benefit in improving workman safety as well as increasing productivity on a construction project.

Conventional devices provide some of the desired general capabilities that have heretofore been proposed. These prior devices fall into two categories. First, some devices are fixed at a point of attachment with respect to the steel beam members. The fixed devices provide a method for securing a safety line, but inherently limit the steel worker's speed and mobility due to the necessity of having to stop to clip on and off of a fixed location or a fixed line.

Second, other types of devices are moveable with respect to the beam to which it is attached. However, the configuration of these devices is such that they have limitations. For example, a device needs to be moveable along the beam and free sliding without being caught and wedged on the beam. Additionally, the device needs to be lightweight and unencumbersome to allow the device to be picked up and relocated to a new steel beam. Moreover, the device must be easily coupled to a flanged beam without being clumsy to manipulate. Furthermore, the device must not be inadvertently disengageable from the flanged beam.

The present invention is a sliding anchorage device that resolves the above-mentioned deficiencies of the prior art.

Applicant is aware of the following U.S. Patents concerning safety devices for securing a workman against a fall.

| U.S. Pat. No. | Issue Date | Inventor | Title |
|---|---|---|---|
| 6,092,62 | Jul. 25, 2000 | Collavino | SAFETY ANCHOR SYSTEM |
| 6,076,633 | Jun. 20, 2000 | Whitmer | PERSONNEL SAFETY DEVICE |
| 5,711,397 | Jan. 27, 1998 | Flora, et al. | SAFETY DEVICE FOR STEELWORKERS |
| 5,092,426 | Mar. 3, 1992 | Rhodes | SAFETY DEVICE AND SYSTEM |
| 5,029,670 | Jul. 9, 1991 | Whitmer | FRAME ERECTION SAFETY SYSTEM AND COMPONENTS THEREOF |
| 4,928,790 | May 29, 1990 | Franks | RESTRAINING DEVICE |
| 4,767,091 | Aug. 30, 1988 | Cuny | ANTIFALL SAFETY DEVICE |
| 4,052,028 | Oct. 4, 1997 | Cordero, Jr. | STRUCTURAL STEELWORKER'S SAFETY CLAMP |

Collavino, U.S. Pat. No. 6,092,623, discloses a safety anchor system that provides protection to workers that are working on an elevated platform. The safety harness system preferably includes two anchoring devices that are spaced apart on a concrete slab. An extension member extends between the anchoring devices. A tether extends between a safety harness worn by the worker and the extension member. The tether is moveable along the entire length of the extension member, which results in an increased range of motion to the worker. The anchorage devices have latching members with extensions of varying dimensions to accommodate variety of concrete slab configurations.

Whitmer, U.S. Pat. No. 6,076,633, discloses a fall protection device that can be attached to a structural member. The device comprises a generally U-shaped member having a long leg and a short leg, a spring-loaded plunger mechanism that serves to lock a removable retainer bar in a position to securely engage a pre-existing structural member, and an attachment point for a lanyard or other fall protection device. The spring-loaded plunger also includes a positive locking mechanism.

Flora, et al., U.S. Pat. No. 5,711,397, discloses a safety device for steelworkers. The devise is adapted to be slidably secured about a flanged beam to attach a lifeline to workmen and to secure workmen against falls. The device comprises an elongate bar member having a plurality of apertures therethrough, and first and second L-shaped jaw members suitable for clamping about the flange of the beam. The second L-shaped jaw member is slidably fixed to the elongate member by a slide housing attachment portion that includes a barrel portion that allows the elongate member to slidably pass therethrough in a close fitting relationship. The second L-shaped jaw member also includes at least one aperture through the barrel portion. A locking pin is provided which passes through any one of the plurality of apertures in the elongate member, and through the barrel portion of the slide housing attachment portion. The locking pin is repositionable from a first, unengaged position to a second, inserted locking position, so that when in an inserted position, the locking pin locks the elongate member and the slide housing attachment portion, to thereby adjustably fix the distance between the first L-shaped jaw member and the second L-shaped jaw member.

Rhodes, U.S. Pat. No. 5,092,426, discloses first and second elongated members slidably communicating to form a beam of variable length to span the top surface of the structure on which a worker is positioned. Clamping surfaces extend from the ends of the beam to engage the sides of the structure. A lever pivotally mounted on the first elongated member is connected through a link to the second elongated member to shorten the beam and urge the clamping surfaced against the structure. A worker's safety line may be attached to the device such that the lever is locked relative to the first elongated member to secure the device to the structure whenever the safety line is attached.

Whitmer, U.S. Pat. No. 5,029,670, discloses a removable safety system, for construction workers, that is mounted on an I-beam. The safety system includes a cable handhold to which a safety lanyard may be fastened. The ends of the cable are terminated by a special device that increases the grip of the device on the beam when a load is applied. The safety system may be installed on the I-beam at ground level and hoisted with the I-beam as it is positioned for attachment to a building or bridge.

Franks, U.S. Pat. No. 4,928,790, discloses a restraining device having an anchorage, the length of which may be contracted to cause pads on the ends thereof to apply pressure to the side of an elevated work surface to secure the anchorage. The device further includes a tether, having one end attached to the anchorage and the opposed end attached to a harness that is worn by a worker, to keep a worker from falling from the elevated work surface.

Cuny, U.S. Pat. No. 4,767,091, discloses a safety device for mounting on a beam section including a body comprising two articulated portions having projections that produce a wedging effect on the beam section when under the pull of a load.

Cordero, Jr., U.S. Pat. No. 4,052,028, discloses a safety clamp to which a workman's lifeline is connected. The safety clamp is removable form, and slidably attached to, a flanged structural beam. The clamp includes a pair of complementary U-shaped jaw members slidably coupled to a bar member disposed transverse the beam. A quick-release lock mechanism is provided to release the lock of each jaw member to the bar member. Each jaw member is defined by a horizontal upper and lower plate members interconnected by a vertical side member. Rollers or bearings are connected to the upper and side plates to reduce frictional engagement between the clamp and structural beam to which the clamp is connected, thereby allowing the clamp to slide along the beam.

OBJECTS OF THE INVENTION

The principal object of the present invention is to provide a safety device for steelworkers.

Another object of the invention is to provide a device that is slidably coupleable to a flanged structural beam.

A further object of this invention is to provide a device that is slidable along a flanged beam without becoming wedged there-against.

A further object of this invention is to provide a device that is lightweight and easily moveable.

Another object of this invention is to provide a device that may be simply engaged or disengaged from a flanged beam by a worker using one hand.

Another object of this invention is to provide a device that has ample strength for its intended purpose.

A further object of the present invention is to provide a device that is not capable of being inadvertently disengaged from a flanged beam.

Another object of the invention is to provide a device that is attachable to a wide variety of flanged beams of different widths.

SUMMARY OF THE INVENTION

The present invention is an anchorage safety device for steelworkers. The anchorage device is adapted to be slidably secured about a flanged structural beam and to which a lanyard may be attached to secure a workman against a fall. The lightweight device may be easily managed by a workman. Moreover, with only one hand, the workman may couple or remove the anchorage device from a flanged beam. The device utilizes a pair of novel clamps that secure and maintain the device to a flanged beam. The clamps are configured such that inadvertent disengagement of the device from the beam is obviated.

In the broadest sense, the invented anchorage device relates to safety device to which a lanyard may be attached in order to secure a workman. The device includes a cross-member having a midpoint and opposed terminal ends, said cross-member further having an aperture. A clamp is provided which is slidably attached to said cross-member. The clamp includes a ratchet pawl having a tooth, wherein said tooth communicates with the aperture such that an unilateral force applied to said clamp that is directed away from the midpoint of said cross-member does not disengage said tooth from the aperture, while a force applied to said clamp that is directed towards the midpoint may disengage said tooth from the aperture.

BRIEF DESCRIPTION OF THE DRAWINGS

The foregoing and other objects will become more readily apparent by referring to the following detailed description and the appended drawings in which.

DETAILED DESCRIPTION

The present invention is an anchorage safety device for steelworkers. The anchorage device is adapted to be slidably secured about a flanged structural beam and to which a lanyard may be attached to secure a workman against a fall. The lightweight device may be easily managed by a workman. Moreover, with only one hand, the workman may couple or remove the anchorage device from a flanged beam. The device utilizes a pair of novel clamps that secure and maintain the device to a flanged beam. The clamps are configured such that inadvertent disengagement of the device from the beam is obviated.

Figure 1:
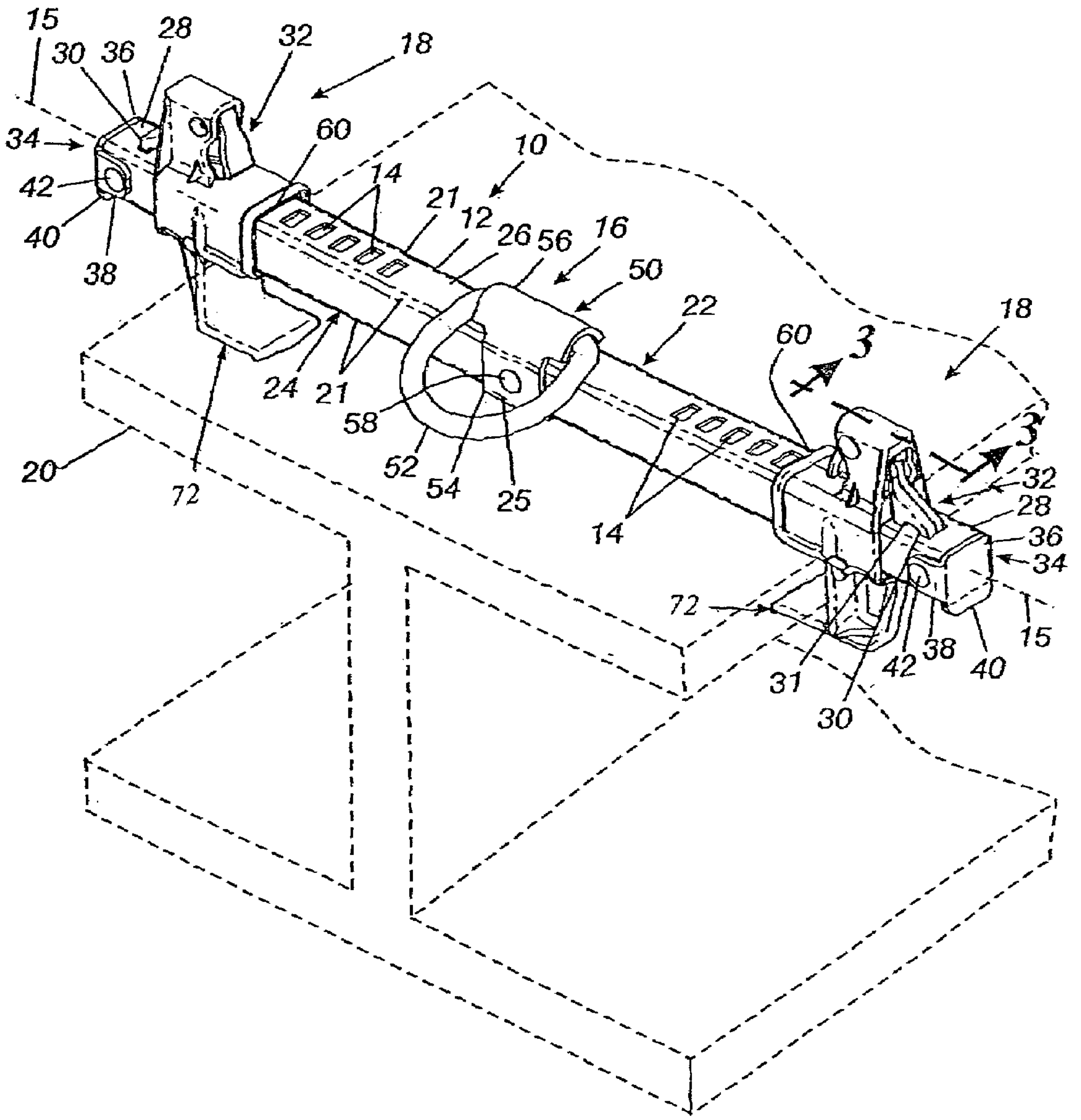
FIG. 1 is a perspective view of the invented anchorage device attached to structural flanged beam.
Figure 2:
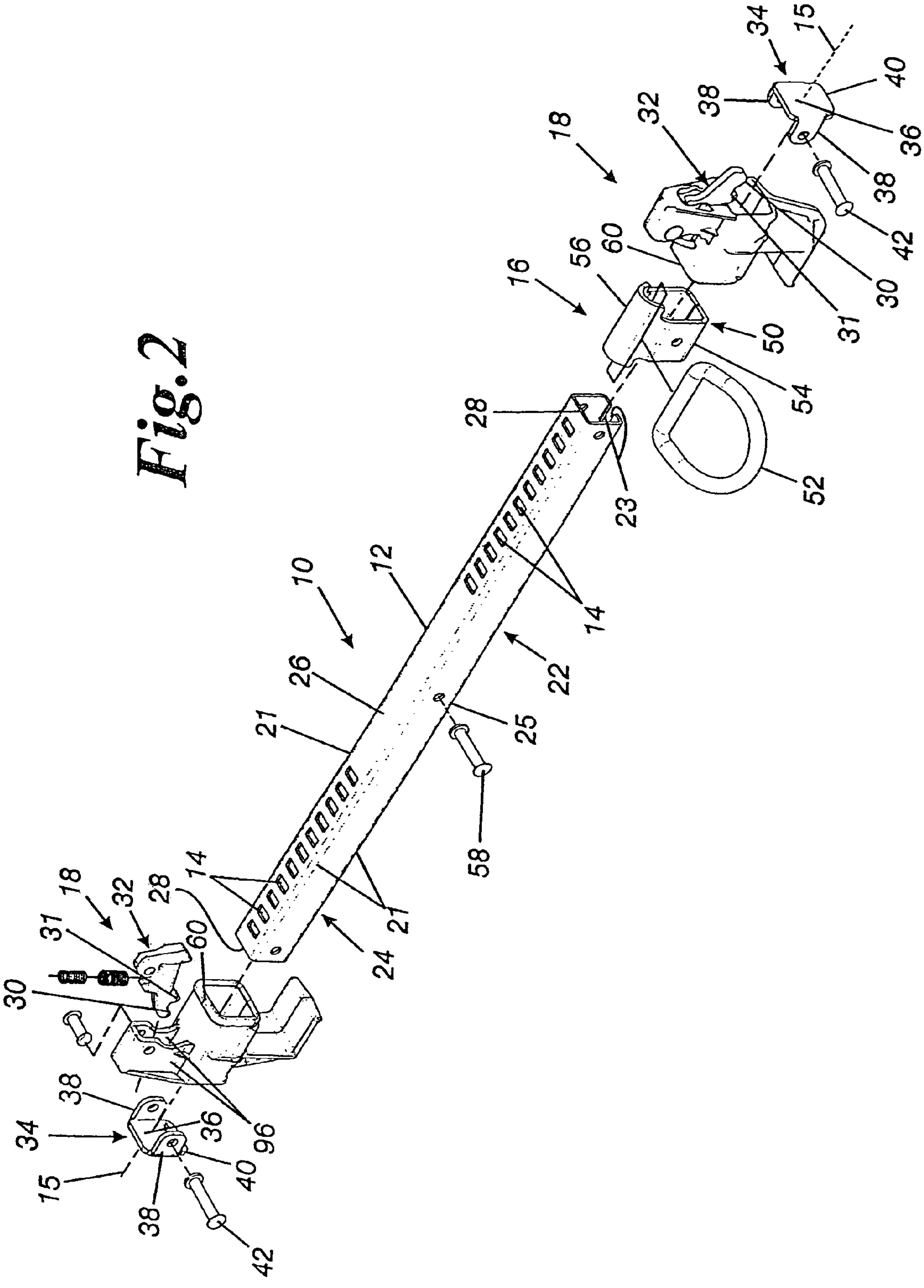
FIG. 2 is a partially exploded perspective view of the device of FIG. 1.

Referring to the drawings, and particularly to FIGS. 1 and 2, the invented anchorage device 10 includes an elongate cross-member 12 having a plurality of apertures 14 formed, in series, along its longitudinal axis 15, a lanyard attachment implement 16 to which a worker's lanyard can be clipped, and a pair of opposed clamps 18 for releasably coupling the anchorage device 10 to a flange of a structural beam 20 (shown only in FIG. 1).

The cross-member 12 is formed of high-strength, durable material such as, for example, low-carbide steel. Although various configurations may be used, preferably the cross-member 12 has a generally rectangular shape with a rectangular or square cross-section. The rectangular or square cross-section simplifies the device 10 since the clamps 18 and lanyard attachment implement 16 need only to follow the contour of the cross-member 12 in order to keep these components from rotating about the cross-member 12.

The cross-member 12 may be formed by a steel stamping process, casting, or other known manufacturing technique. Stamping, wherein the cross-member sides are bent to form the desired cross-section, is preferred, since this process allows for the cross-member 12 to be cost effectively and efficiently manufactured. Moreover, by stamping, the cross-member 12 may be made hollow, yielding a lightweight device 10 that is easily managed by a workman. Furthermore, stamped steel is slightly resilient, as opposed to casting, thereby allowing for cross-member 12 to slightly flex in order to absorb energy that may be applied to the device 10 by a fallen workman.

Longitudinal corners 21 of the cross-member 12 are preferably rounded. The rounded corners 21 are less subject to fatigue and failure than would be true 90 degree corners. As the stamped cross-member 12 has ample strength for its intended use, it is not necessary to join together its free longitudinal edges 23 (FIG. 2) by welding or the like.

The orientation of the anchorage device 10 is not limited to a specific placement on a structural beam. For example, the device 10 may be attached to the top or to the bottom flanged beam. For purposes of this disclosure, the device 10 will be described with respect to an orientation that corresponds to being positioned atop a beam.

The anchorage device 10 has equivalent first and second sections 22, 24 separated by a midpoint 25. Accordingly, any disclosure regarding one section will apply equally to the other section.

The apertures 14 are formed through the upper wall 26 of the cross-member 12, and are formed in series from about the mid-point 25 of the cross-member 12 to near its terminal ends 28. The apertures 14 are on ½ inch centers, which coincides with the spacing between teeth 30, 31 provided on ratchet pawls 32 that form part of each clamp 18. The apertures 14 and the ratchet pawl teeth 30, 31 cooperate to selectively secure the clamps 18 in a position along the longitudinal length of the cross-member 18. As such, each clamp 18 may be set at ½ inch increments which allows for the device 10 to be attached to a variety of standard sized structural beams.

End caps 34 are provided at the terminal ends of the cross-member 12. Each end cap 34 includes a plate 36 covering the end of the cross-member 12, a pair of flanges 38 extending from opposed sides of the plate 36 along the sides of the anchorage device 10, and a tab 40 extending a distance away from the cross-member 12. A contiguous opening, provided through the flanges 38 and cross-member 12, receives a mechanical fastener 42 that affixes the end cap 34 to the cross-member. Other suitable methods for attaching the end cap 34 to the cross-member 12 may be used such as welding, rivets, or the like.

The flanges 38 provide abutment surfaces that limit the clamps' 18 travel along the cross-member 12 so that the clamps 18 cannot inadvertently disengage from the device 10. The flanges 38 also space the clamps 18 approximately ¾ inch from the terminal ends of the cross-member 12, thus providing a working surface usable by a workman in moving the clamps 12 from the terminal ends 28 towards the midpoint 25 of the cross-member 12. That is, a workman may position a gloved finger between the tab 40 and clamp 12, and press against them to cause the clamp 12 to move towards the midpoint 25.

The lanyard attachment implement 16 is affixed to the midpoint 25 of the cross-member 12, and is configured for allowing a workman's lanyard to be securely clipped thereto. Because the attachment implement 16 is affixed at the cross-member mid-point 25, and is centrally disposed between the clamps 12, the device 10 does not become off-set as it is being pulled along a structural beam. Accordingly, the fixed placement of the attachment implement 16 keeps the device 10 from becoming cockeyed whereby it would act as a self-energizing brake against the beam.

Not to be construed as limiting, the preferred attachment implement 16 includes a T-shaped bracket 50 for rotatably holding a ring 52 with respect to the cross-member 12. The T-shaped bracket 50 includes a base portion 54 fitted to the contour of the cross-member 12 and an arcuate, elongate top portion 56. The rectangular cross-section of the base portion 54 restrains the attachment implement 16 from rotating about the cross-member 12. A contiguous opening is provided through the base portion 54 and the cross-member 12 through which a mechanical fastener 58 is received affixing the attachment implement 16 at the midpoint 25 of the cross-member 12.

The arcuate top portion 56 forms a channel, between the top portion 56 and the cross-member 12, through which the ring 52 is rotatably received. The ring 52 is close fitted within the channel so that there is minimal play, but with enough clearance so that the ring 52 may freely rotate about the longitudinal axis 15 roughly 180°.

The ring 52 is anchored atop the cross-member 12 in order to enhanced accessibility for a workman for clipping his lanyard thereto. Further, when the ring 52 is rotated to either side of the cross member 12, the ring 52 rests upon the cross-member upper wall 26 such that it remains spaced from a structural beam. This spacing simplifies lanyard attachment by providing room for a lanyard clip to be snapped onto the ring 52 without having to adjust or move the ring 52. In sum, since the ring 52 is fixed against movement along the longitudinal axis 15 of cross-member 12, and because it stands away from the cross-member 12, a workman needs only to use one hand to clip his lanyard to the device 10, by simply striking the lanyard clip against the ring 52.

The base portion 54 and the top portion 56 extend a distance along the longitudinal axis 15 of the cross-member 12, providing sufficient structure that is capable of withstanding substantial force loads associated with a fallen workman. Preferably, the top portion 56 is spaced a distance above the cross-member 12 so that the leading edge 60 of each clamp 12 may be moved inward to a position juxtaposed to the base portion 54 in order to couple to a very narrow beam. With the preferred lanyard implement configuration, necessary strength characteristics are obtained while still allowing for the opposed clamps 18 to be positioned sufficiently close together such that the device 10 may be coupled to a 3½ inch flanged beam.

The opposed clamps 12 are identical. As such, the below description applies equally to both of the clamps 12. Since the clamps 12 may be identical, manufacturing is advantageously simplified and more cost effective.

Figure 3:
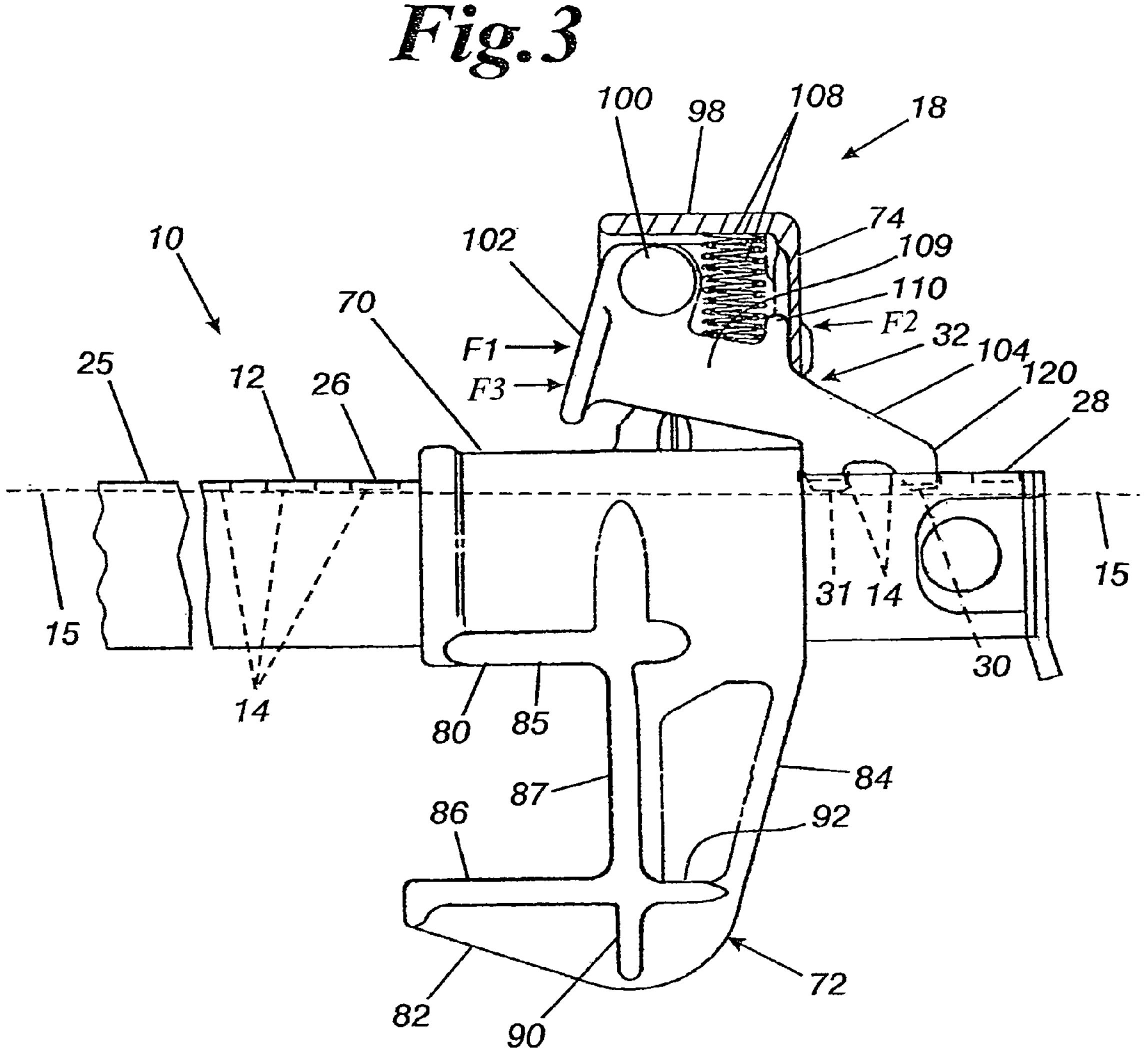
FIG. 3 is a fragmented side view of the device of FIG. 1, showing a partial cross-section of a clamp that is carried on the device, the plane of the cross-section being indicated by section line 3—3 of FIG. 1.
Figure 4:
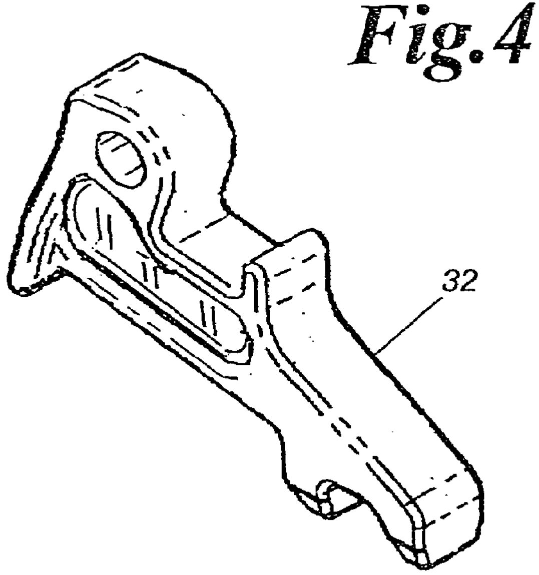
FIG. 4 is a perspective view of a ratchet pawl that is used to lock the clamp of the FIG. 1 into a position along the device.

Referring to FIG. 3, the clamp 18 includes a sleeve 70 slidably mounted to the cross-member 12; a jaw 72, carried by the sleeve 70, for coupling to a flanged beam; and a housing 74 containing the ratchet pawl 32.

The sleeve 70 has a rectangular or square cross-section that follows to the contour of the cross-member 12. The sleeve 70 is close fitted to the cross-member 12, with sufficient clearance to allow the clamp 18 to freely slide along the cross-member 12. Moreover, because the cross-member 12 and sleeve 70 have complementary cross-sections, the clamp 18 cannot rotate about the longitudinal axis 15 of the cross-member 12.

The jaw 72 is carried on the underside of the sleeve 70. The jaw 72 is generally configured in a C-shape to allow the clamp 18 to couple to the flange of a beam. The jaw 72 includes an first portion 80, formed by the sleeve 70, a second portion 82 that is generally parallel with the upper portion 80, and an intermediate third portion 84 that joins and spaces apart the first and second portions 80, 82. Respective edges 85, 86, 87 of the first, second and third portions 80, 82, 84, which surround the flange of a beam, are preferably rounded in order to aid the device 10 in being slid along the beam. The rounded edges 85, 86, 87 allow for the device 10 to glide over defects in the beam when being pulled by a workman.

Integral ribs may be formed in the jaw 72 to provide additional strength. For example, the illustrated vertical and horizontal ribs 90, 92 are placed in tension when resisting deformation caused to the jaw 72 when it is subjected to a substantial jerk force of a fallen workman.

Optionally, a protective plastic cover (not shown) may be attached to the jaw 72, covering the interior of the jaw 72 in order to protect it from being nicked, marred, or the like, when it engages against a structural beam. As such, the cover reduces premature fatigue and failure of the device 10. The protective cover may be clipped onto the jaw 72, attached by a mechanical fastener, or the like, for example.

The housing 74 is unitary with the sleeve 70 and is positioned above the upper wall 26 of the cross-member 12 for full viewability and ease of use by a workman. The housing 74 includes sides 96 (FIG. 2) and a top 98 which define a longitudinally directed chamber through the housing 74.

The ratchet pawl 32 is pivotally attached within the chamber by a pivot 100 that is common with the housing 74 and the ratchet pawl 32. The ratchet pawl 32 has an enlarged engagement portion 102, extending out of a first side of the housing 98, and a toothed portion 104, extending beyond the second side of the housing 74.

The engagement portion 102 provides a surface against which a workman may press his thumb or finger as one step of a two step process used to release the clamp 18 from a locked position in order to move the clamp 18 to a selected new position. The toothed portion 104 includes at least one tooth, which when received within a cross-member aperture 14, releaseably locks the device 10 onto a structural beam.

The ratchet pawl 32 preferably has two teeth 30, 31. The teeth 30, 31 are configured so that, once engaged within an aperture 14, they remain engaged therein regardless of forces F1 applied to any portion of the clamp 18, including forces that are applied to the ratchet pawl engagement end 102, that are directed towards the respective terminal end 28 of the cross-member 12.

Each tooth 30, 31, and each aperture 14, has first and second abutment surfaces. For purposes of this disclosure, the first abutment surfaces are defined to be those surface closer in proximity to the terminal end 28 of the cross-member 12, while the second abutment surfaces are defined to be the surfaces closer to the midpoint 25 of the cross member 12, as compared to the first abutment surfaces.

Figure 5:
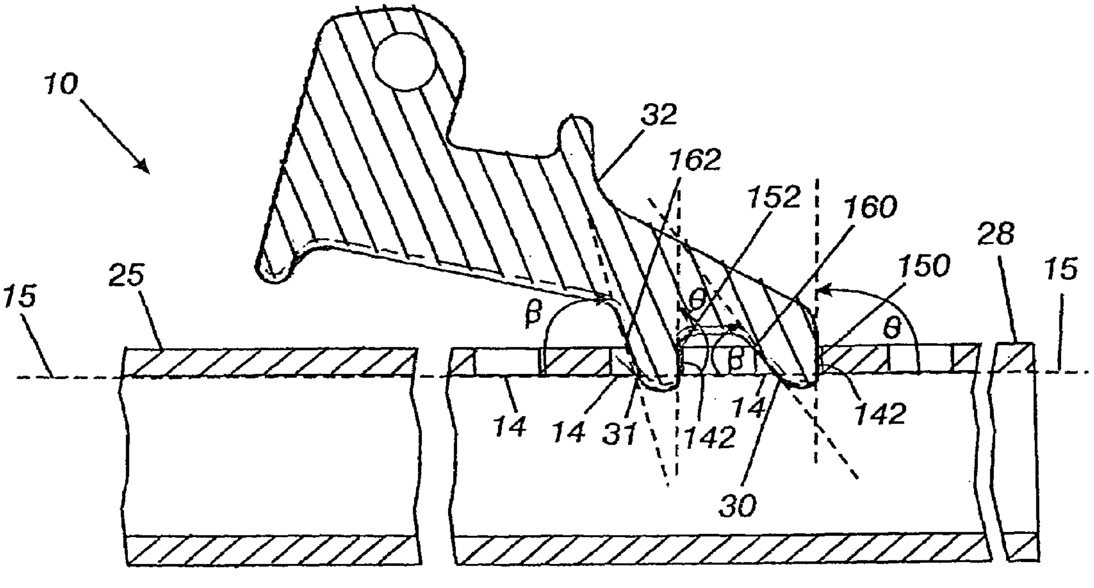
FIG. 5 is a fragmented cross-sectional view of the device of FIG. 1, showing in particular a ratchet pawl engaged within cross-member apertures, the plane of the cross-section indicated by section line 3—3 of FIG. 1.

Referring to FIG. 5, when the ratchet pawl 32 is positioned within an aperture 14, the first abutment surfaces 150, 152 of the teeth 30, 31 are perpendicular to, or obtuse to, the cross-member longitudinal axis 15, as shown by angle Alpha 0. Similarly, the abutment surfaces 150, 152 are perpendicular to, or obtuse to, the first surfaces 142 of the respective aperture 14.

Accordingly, when a force is applied, attempting to urge the clamp 18 (FIG. 3) towards the terminal end 28 of the cross member 12, the abutment surfaces 150, 152 of the teeth 30, 31 act against the respective first abutment surfaces 142, thereby keeping the clamp 18 from moving. That is, the shape of the teeth 30, 31 causes them to remain embedded within the apertures 14.

The second abutment surfaces 160, 162 of the teeth 30, 31 are acutely sloped, in relation to the longitudinal axis, as illustrated by Beta(β). As such, a force F2 (FIG. 3) applied on the clamp 18 causes the teeth 30, 31 to slide out of respective apertures 14, allowing the clamp 18 to be moved towards the midpoint 25 of the cross-member 12. In this manner, the clamp 18 may be easily slid to various positions in order couple the device 10 onto beams of different widths.

Various suitable methods may be used in order to provide a force that urges the ratchet pawl teeth 30, 31 into respective apertures 14. Once positioned within the apertures 14, the teeth 30, 31 remain therein until a workman purposefully overcomes the force in order to release the teeth 30, 31 from the apertures 14, as described in further detail below.

A preferred arrangement is illustrated in FIG. 3 wherein two nested, coaxial springs 108, coiled in opposite directions, are provided to urge the teeth 30, 31 into the apertures 14. The springs 108 are disposed within the clamp chamber, compressed between the housing top 98 and an intermediate portion 109 of the ratchet pawl 32. A lip 110, extending from the intermediate portion 109 assists in confining the springs 108 to a functioning position.

Figures 6, 7, 8:
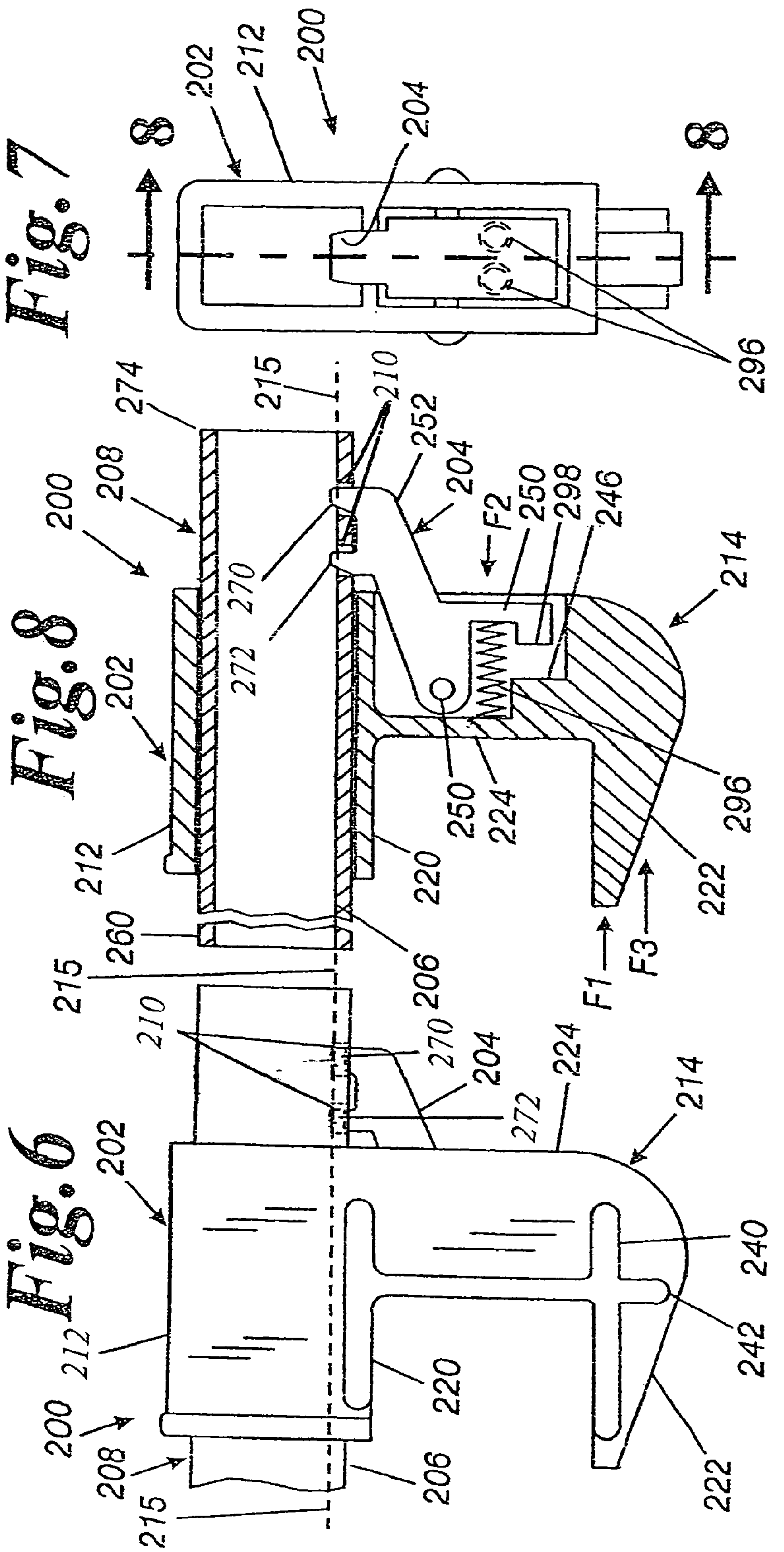
FIG. 6 is a fragmented side view an alternative embodiment of an anchorage device, showing in particular an alternative clamp having a ratchet pawl pivotally attached within a C-shaped jaw for locking the clamp in a position along the underside of the device.
FIG. 7 is an end view of the clamp illustrated in FIG. 6.
FIG. 8 is a cross-sectional view of the clamp of FIG. 6, the plane of the section being indicated by section line 8—8 of FIG. 7.

FIGS. 6–8 illustrate an alternative anchorage device 200, showing in particular one of a pair of clamps 202 provided with the device 200. Referring to FIGS. 6 and 8, the device 200 is as described above in the preferred embodiment, except that the clamps 202 are configured to carry a ratchet pawl 204 along a lower wall 206 of a cross-member 208. Accordingly, apertures 210 are provided in the lower wall 206, instead of in a top wall as was previously described in the preferred embodiment. Since the clamps 202 are identical, the below description applies equally to both.

The clamp 202 includes a sleeve 212 slidably mounted to the cross-member 208; a jaw 214, carried by the sleeve 212, for coupling to the flange of a structural beam; and the ratchet pawl 204 which is housed within the jaw 214.

The sleeve 212 has a rectangular or square cross-section (FIG. 7) that follows the contour of the cross-member 208. The sleeve 212 is close fitted to the cross-member 208, with sufficient clearance to allow the sleeve 212 to freely slide along the cross-member 208. Since the cross-member 208 and the sleeve 212 have complementary cross-sections, the clamp 202 cannot rotate about the longitudinal axis 215 of the cross-member 208.

The jaw 214 is carried on the underside of the sleeve 212. The jaw 214 is generally configured in a C-shape to allow the clamp 202 to be coupled to the flange of a beam. The jaw 214 includes a first portion 220, formed by the sleeve 212, a second portion 222 that is generally parallel with the first portion 220, and an intermediate third portion 224 that joins and spaces apart the first and second portions 220,222. Respective edges of the first, second and third portions 220, 222, 224, which routinely engage a beam, are preferably rounded in order to aid the device 200 in being slid along the beam. The rounded edges allow for the device to slid over defects in the beam when being pulled by a workman. As illustrated in FIG. 6, integral ribs 240, 242 may also be formed on the jaw 214 in order to provide additional strength.

Referring to FIG. 8, the third portion 224 of the jaw 214 forms a housing 246, which in turn defines a chamber. The ratchet pawl 204 is partially disposed within the chamber, where it is rotatably attached to the housing by a pivot 250. The ratchet pawl 204 also has an engagement section 250 that is preferably recessed within the housing 246, and a toothed second section 252 that extends beyond the housing 246.

The engagement section 250 provides a surface against which a workman may press his thumb or finger as part of the process of releasing the clamp 202 from a locked position for movement to a selected new position. The toothed second section 252 includes at least one tooth, which when received within a cross-member aperture 210, locks the clamp 202 from moving away from the midpoint 260 of the cross-member 208.

Figure 8A:
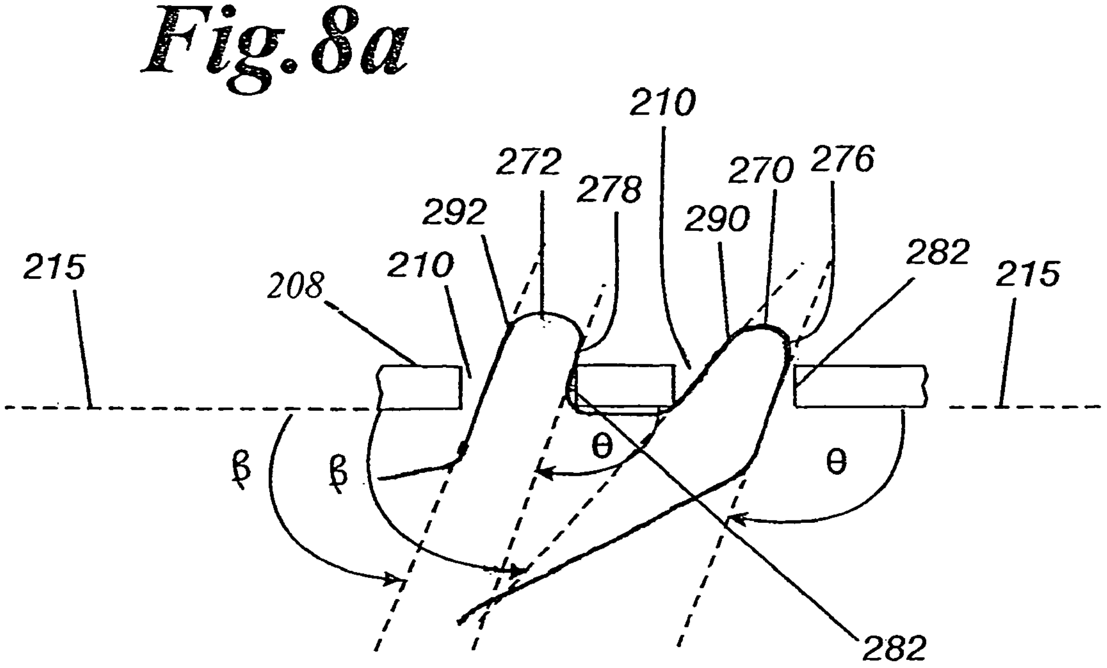
FIG. 8*a* is a detail of FIG. 8, showing in particular engagement of the ratchet teeth within cross-member apertures.

The ratchet pawl 204 preferably has two teeth 270, 272. The teeth 270, 272 are identical and to those described in the preferred embodiment, as well as their manner of communicating with the apertures 210 in order to lock the clamp 212 in a position along the cross-member 208. The teeth 270, 272 are configured so that, once engaged within an aperture 210, they remain engaged therein regardless of forces F1 that may be applied to any portion of the clamp 202 that are directed towards the respective terminal end 274 of the cross-member 208. Referring to FIG. 8*a*, in particular, each tooth 270, 272 has a first abutment surface 276, 278 that is perpendicular to, or obtuse to, the longitudinal axis 215 of the cross member 208, as shown by Alpha (θ). As the teeth 270, 272 are forced against first abutment surfaces 282 of the apertures 210, they are directed into the aperture 210 and are unable to escape there-from.

Also like the preferred embodiment, the second abutment surface 290, 292 of each tooth 270, 272 is acutely angled in relation to the longitudinal axis 215, as shown by Beta(β).

As such, the teeth 270, 272 easily escape the apertures 210 when the clamp is being slid towards the midpoint 260 (FIG. 8) of the cross-member 208.

Referring to FIG. 8, a pair of coiled springs 296 (see also FIG. 7) is disposed within the chamber, compressed between the housing 246 and the engagement section 250 of the ratchet pawl 204. A lip 298 is provided to assist in maintaining the springs 296 in position within the housing 246. The springs 296 urge the ratchet pawl teeth 270, 272 to remain embedded within the apertures 210 until the force of the springs 296 is purposely overcome by a workman. As it will be understood by those skilled in the art, other suitable arrangements may be used to urge the ratchet pawl teeth 270, 272 into position within the apertures 210.

Figures 9, 10, 11:
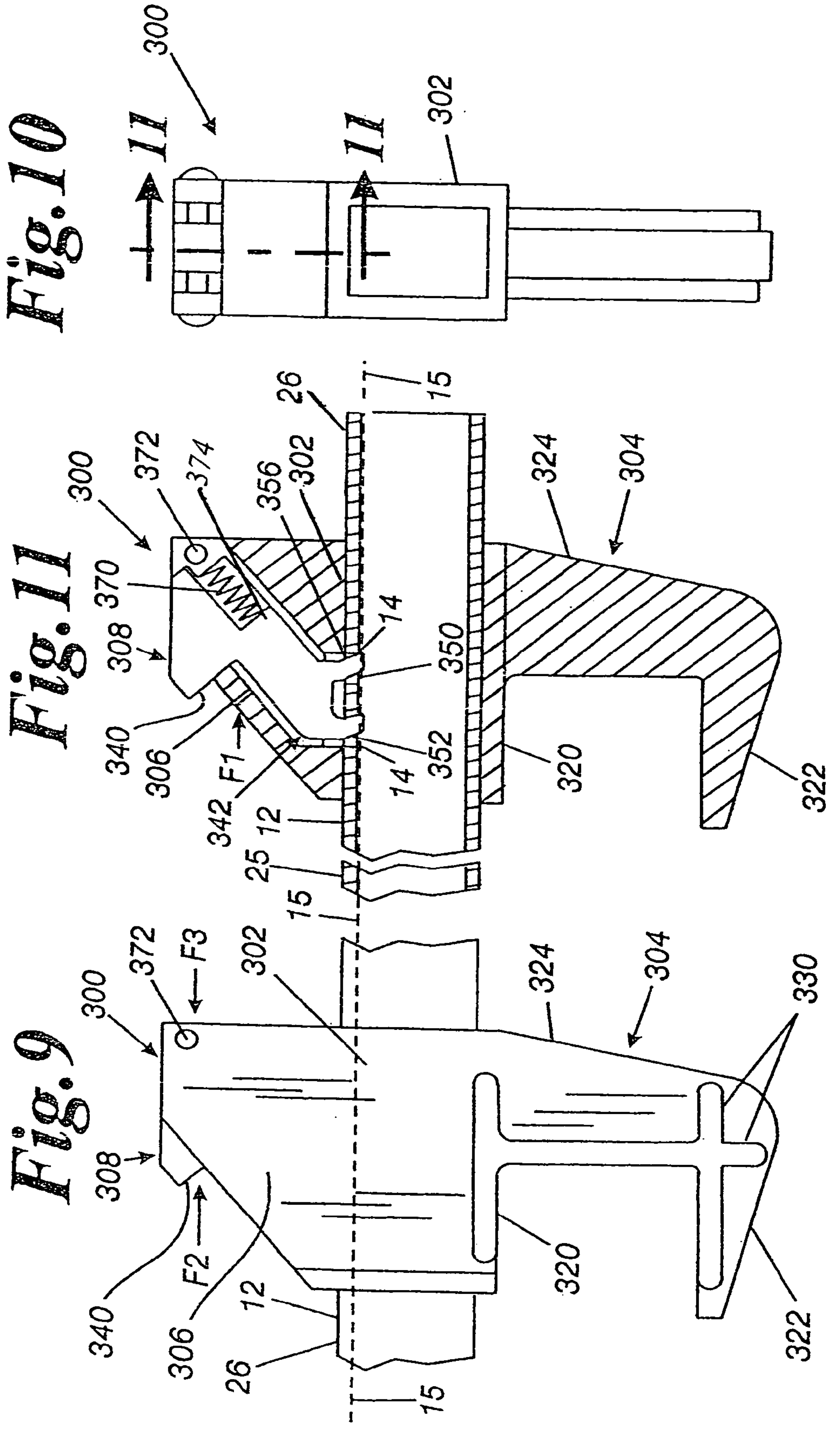
FIG. 9 is a fragmented side view of another embodiment of an anchorage device showing in particular still another alternative clamp wherein the clamp has a ratchet pawl slidably disposed therein for locking the clamp in a position along the device.
FIG. 10 is an end view of the clamp illustrated in FIG. 9.
FIG. 11 is a cross-sectional view of the clamp of FIG. 9, the plane of the section being indicated by section line 11—11 of FIG. 10.

Referring to FIGS. 9–11, still another alternative clamp 300 illustrated, which is suitable for use with the anchorage device described in the preferred embodiment. That is, the device is identical to that described in the preferred embodiment, except for clamps 300. As such, only the clamps 300 are described in detail. Further, as the alternative clamps 300 are identical, the below description applies equally to both.

Referring to FIGS. 9 and 11, the clamp 300 includes a sleeve 302 slidably mounted to the cross-member 12; a jaw 304, carried by the sleeve 302, for coupling to the flange of a structural beam; a housing 306; and a ratchet pawl 308 disposed within the housing 306.

The sleeve 302 has a rectangular or square cross-section (illustrated in FIG. 10) that follows the contour of the cross-member 12. The sleeve 302 is close fitted to the cross-member 12, with sufficient clearance to allow the sleeve 302 to freely slide along the cross-member 12. Moreover, because the cross-member 12 and the sleeve 302 have complementary cross-sections, the clamp 300 cannot rotate about the longitudinal axis 15 of the cross-member 12.

The jaw 304 is carried on the underside of the sleeve 302 and is identical in configuration to the jaw described in the preferred embodiment. In brief, the jaw 304 is generally configured a C-shape to allow the clamp 300 to couple to the flange of a beam. The jaw 304 includes a first portion 320, formed by the sleeve 302, a second portion 322 that is generally parallel with the first portion 320, and an intermediate third portion 324 that joins and spaces apart the first and second portions 320, 322. Respective edges of the first, second and third portions are preferably rounded in order to aid the device in being slid along the beam. Additionally, integral ribs 330 (FIG. 9) may be provided on the jaw 304 in order to provide additional strength.

The housing 306 is unitary with the sleeve 302 and is positioned above the upper wall 26 of the cross-member 12 for full viewability and ease of use by a workman. The housing 306 defines a chamber into which the ratchet pawl 308 is slidably disposed. The ratchet pawl 308 has an engagement section 340 extending out of the housing 306 and a toothed section 342, as shown in FIG. 11. The toothed section 342 includes at least one tooth, which when received within a cross-member aperture 14, locks the clamp from being forced away from the midpoint 25 of the cross-member 12.

Figure 11A:
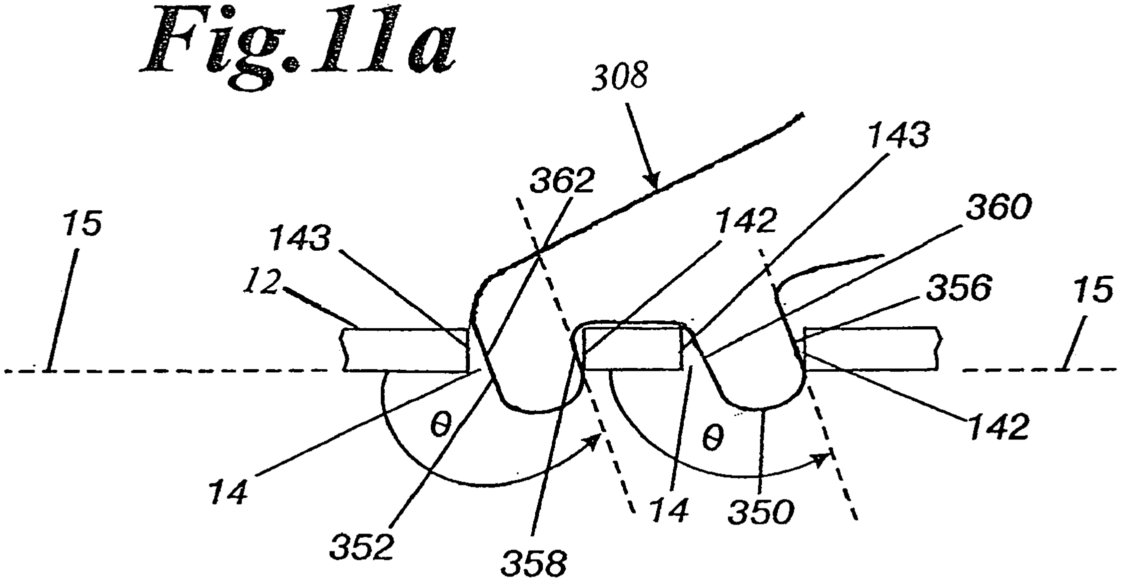
FIG. 11*a* is a detail of FIG. 11, showing particular engagement of the ratchet pawl teeth within cross-member apertures

The ratchet pawl 308 preferably has two teeth 350, 352. The teeth 350, 352 are identical to those described in the preferred embodiment. In short, the teeth 350, 352 are configured so that, once engaged within an aperture 14, they remain engaged therein regardless of forces F1 that may be applied to any portion of the clamp that are directed away from the midpoint 25 of the cross-member 12. Referring to FIG. 11*a*, in particular, each tooth 350, 352, has a first abutment surface 356, 358 that is normal to, or obtuse to, the longitudinal axis 15 of the cross-member 12, as shown by Alpha(θ). Accordingly, when force F1 acts upon the clamp 300, the ratchet pawl teeth 350, 352 are caused to be directed further into the apertures 14 thereby restraining the clamp 300 from moving along the cross-member 12, as shown in FIG. 11.

Referring to FIG. 11*a*, also identical to the description set-forth in the preferred embodiment, the second abutment surface 360, 362 of each tooth 350, 352 is angled in relation to the second surface 143 of the respective aperture 14 so that the clamp 300 (FIG. 11) may be slid towards the midpoint 25 (FIG. 11) of the cross-member 12.

Referring to FIG. 11, at least one coiled spring 370 is disposed within the chamber, compressed between a pin 372 disposed within the housing 306 and an intermediate section 374 of the ratchet pawl 308. The spring 370 urges the ratchet pawl teeth 350, 352 to remain embedded within apertures 14 until the force of the spring 370 is purposely overcome by a workman. As it will be understood by those skilled in the art, other suitable arrangements may be used to urge the ratchet pawl teeth 350, 352 into position.

Referring to FIG. 3 to illustrate the operation of the device 10, to release the clamp 18 from a coupled position on a flanged beam, the worker must simultaneously apply forces F2, F3 on the enlarged engagement end 102 and on the opposing side of the housing 98 in order to overcome the spring force and to release the ratchet pawl 32 from the apertures 14. A workman can easily perform this operation with only one hand by simply pushing his thumb against the enlarged engagement end 102 while pressing his index finger to the opposed portion of the tapered housing 98. It is important to note that merely applying force to the enlarged engagement end, will not cause the ratchet pawl 32 to disengage from the apertures 14.

Referring to FIG. 1, in use, the anchorage safety device 10 is attached to the flange of a beam 20 by first placing the device 10 transverse the beam 20, then sliding the clamps 18 along the cross-member 12 until they firmly engage the flange. The teeth 30, 31 of the ratchet pawl 32, urged by the springs 108 (FIG. 3), seat into corresponding apertures 14 in the cross-member 12 to lock the clamp 12, and accordingly the anchorage device 10, in place on the beam 20. Once set, the clamp cannot be released except by simultaneous applying two opposing forces F2, F3 (FIG. 3) to the clamp 18, as described further below.

In this position the clamps 18 are equally situated from the lanyard attachment implement 16 at the midpoint 25 of the device 10. Since the lanyard attachment implement 16 is in the middle of the cross-member 12, the device 10 is capable of being slide along the beam 20 without becoming cock-eyed or wedged against the beam 20. That is, the arrangement of the lanyard attachment implement 16 and clamps 18 keep the device 10 from acting as a self-energizing brake against the beam 20.

Also to aid movement of the anchorage device 10 along the beam 20, the edges of the clamp jaws 72 are rounded to keep the edges from being caught up on deformities in the beam's surface.

The workman attaches his lanyard to the device 10 by merely striking his lanyard clip against the lanyard attachment implement ring 52. The top positioning of the ring 52, and its secured attachment to the cross-member 12, allows for the workman to attach his lanyard by simply striking the lanyard clip against the ring 52.

Referring to FIG. 3, to release the anchorage device 10 from the beam, the worker must simultaneously apply forces F2, F3 on the enlarged engagement end 102 of the ratchet pawl 32 and the opposed side of the housing 98 in order to overcome the force of the springs 108 and release the ratchet pawl teeth 30,31 from the apertures 14. A workman can easily perform this operation with only one hand by simply pushing his thumb against the enlarged engagement end 102 while pressing his index finger to the opposed portion of the tapered housing 98. It is important to note that merely applying force F2 to the enlarged engagement end 102, or any other part of the housing 98, will not cause the ratchet pawl 32 to disengage from the apertures 14 due to the shape of the ratchet pawl teeth 30, 31. By applying opposing forces F2, F3, the teeth 30, 31 back-out and are released from the apertures 14. As such, if the lanyard becomes wrapped around the clamp 18, or if an object or another worker engage the clamp 18, the clamp 18 will remain secured in position. As a further safety consideration, the tapered shape of the housing 98 encourages a potentially entangled lanyard to slip over the clamp 18.

SUMMARY OF THE ACHIEVEMENT OF THE OBJECTS OF THE INVENTION

From the foregoing, it is readily apparent that I have invented an improved anchorage device that is slidably coupleable to a flanged beam to which a lanyard may be attached to secure a workman against a fall. The anchorage device is also configured to be lightweight and easily handled by a workman. Additionally, the device is easily slidable along a flanged beam without becoming wedged there-against. Moreover, clamps on the anchorage device require only one of the workman's hands to manipulate and properly position. Furthermore, the clamp is configured such the device cannot be inadvertently disengageable from the flanged beam.

It is to be understood that the foregoing description and specific embodiments are merely illustrative of the best mode of the invention and the principles thereof, and that various modifications and additions may be made to the apparatus by those skilled in the art, without departing from the spirit and scope of this invention.

What is claimed is:

1. An anchorage device for securing a workman to a flanged structural member, said anchorage device comprising:

(a) an elongated cross-member defining a plurality of longitudinally-spaced apertures;

(b) first and second clamps located on said cross-member, and adapted to engage respective opposing flanges of the structural member, said first clamp being slidably mounted for movement along said cross-member relative to said second clamp;

(c) an adjustable pawl attached to said first clamp, and comprising:

(i) a locking tooth adapted for residing in a selected one of said plurality of apertures of said cross-member, thereby releasably locking said first clamp in a fixed clamp-locking position on said cross-member relative to said second clamp; and (ii) a first engagement portion for receiving a manual force applied in a first direction to move said pawl and said locking tooth relative to said cross-member;

(d) a pawl housing attached to said first clamp adjacent said pawl and defining a second engagement portion for receiving a manual force applied in a second direction opposite the first direction; and (e) whereby said first clamp is releasable for free sliding movement along said cross-member by applying in the second direction manual force to said housing at the second engagement portion, thereby disengaging said locking tooth from said cross-member; and applying in the first direction manual force to said pawl at the first engagement portion, thereby moving said locking tooth out of the selected aperture and away from said cross-member.

2. An anchorage device according to claim 1, wherein said second clamp is slidably mounted for movement along said cross-member relative to said first clamp.

3. An anchorage device according to claim 2, and comprising a second adjustable pawl attached to said second clamp, and comprising:

a locking tooth adapted for residing in a selected one of said plurality of apertures of said cross-member, thereby releasably locking said second clamp in a fixed clamp-locking position on said cross-member relative to said first clamp;

a first engagement portion for receiving a manual force applied in a first direction to move said second pawl and said locking tooth relative to said cross-member.

a second pawl housing attached to said second clamp adjacent said second pawl and defining a second engagement portion for receiving a manual force applied in a second direction opposite the first direction; and whereby said second clamp is releasable for free sliding movement along said cross-member by applying in the second direction manual force to said second housing at the second engagement portion, thereby disengaging said locking tooth from said cross-member; and applying in the first direction manual force to said second pivoted pawl at the first engagement portion, thereby pivoting moving said locking tooth out of the selected aperture and away from said cross-member.

4. An anchorage device according to claim 1, wherein said cross-member comprises a rigid hollow tube.

5. An anchorage device according to claim 4, wherein said hollow tube has four-sides.

6. An anchorage device according to claim 4, wherein said hollow tubes comprises longitudinal corners, each of said corners being rounded for increased strength.

7. An anchorage device according to claim 1, wherein said pawl is attached at a point is spaced outwardly from said cross-member.

8. An anchorage device according to claim 7, wherein said first engagement portion of said pawl is located between said attachment point and said cross-member.

9. An anchorage device according to claim 1, and comprising a lanyard attachment implement located on said cross-member.

10. An anchorage device according to claim 9, wherein said lanyard attachment implement is permanently fixed to said cross-member.

11. An anchorage device according to claim 9, wherein said lanyard attachment implement is located at a midpoint of said cross-member.

12. An anchorage device according to claim 9, and comprising a ring secured to said lanyard attachment implement.

13. An anchorage device for securing a workman to a flanged structural member, said anchorage device comprising:

(a) an elongated cross-member comprising a rigid hollow tube and defining a plurality of longitudinally-spaced apertures;

(b) a lanyard attachment implement located on said cross-member;

(c) first and second clamps located on said cross-member, and adapted to engage respective opposing flanges of the structural member, said first clamp being slidably mounted for movement along said cross-member relative to said second clamp;

(d) an adjustable pawl attached to said first clamp, and comprising:

(i) a locking tooth adapted for residing in a selected one of said plurality of apertures of said cross-member, thereby releasably locking said first clamp in a fixed clamp-locking position on said cross-member relative to said second clamp; and (ii) a first engagement portion for receiving a manual force applied in a first direction to move said pawl and said locking tooth relative to said cross-member;

(e) a pawl housing attached to said first clamp adjacent said pawl and defining a second engagement portion for receiving a manual force applied in a second direction opposite the first direction; and (f) whereby said first clamp is releasable for free sliding movement along said cross-member by applying in the second direction manual force to said housing at the second engagement portion, thereby disengaging said locking tooth from said cross-member; and applying in the first direction manual force to said pawl at the first engagement portion, thereby moving said locking tooth out of the selected aperture and away from said cross-member.

14. An anchorage device for securing a workman to a flanged structural member, said anchorage device comprising:

(a) an elongated cross-member defining a plurality of longitudinally-spaced apertures;

(b) a lanyard attachment implement located on said cross-member, and comprising a ring permanently positioned at a center point of said cross-member;

(c) first and second clamps located on said cross-member, and adapted to engage respective opposing flanges of the structural member, said first clamp being slidably mounted for movement along said cross-member relative to said second clamp;

(d) an adjustable pawl attached to said first clamp, and comprising:

(i) a locking tooth adapted for residing in a selected one of said plurality of apertures of said cross-member, thereby releasably locking said first clamp in a fixed clamp-locking position on said cross-member relative to said second clamp; and (ii) a first engagement portion for receiving a manual force applied in a first direction to move said pawl and said locking tooth relative to said cross-member;

(e) a pawl housing attached to said first clamp adjacent said pawl and defining a second engagement portion for receiving a manual force applied in a second direction opposite the first direction; and (f) whereby said first clamp is releasable for free sliding movement along said cross-member by applying in the second direction manual force to said housing at the second engagement portion, thereby disengaging said locking tooth from said cross-member; and applying in the first direction manual force to said pawl at the first engagement portion, thereby moving said locking tooth out of the selected aperture and away from said cross-member.

* * * * *